United States Patent [19]
Osborn

[11] Patent Number: 5,898,603
[45] Date of Patent: Apr. 27, 1999

[54] METHOD AND APPARATUS FOR APPROXIMATING A SIGMOIDAL RESPONSE USING DIGITAL CIRCUITRY

[75] Inventor: Stephen G. Osborn, Austin, Tex.

[73] Assignee: Motorola, Inc., Schaumburg, Ill.

[21] Appl. No.: 08/806,350

[22] Filed: Feb. 26, 1997

Related U.S. Application Data

[60] Continuation of application No. 08/463,152, Jun. 5, 1995, abandoned, which is a division of application No. 08/125,670, Sep. 23, 1993, abandoned.

[51] Int. Cl.[6] .................................................. G06F 1/02
[52] U.S. Cl. ..................................................... 364/718.01
[58] Field of Search ...................... 364/715.011, 715.02, 364/715.03, 722, 748.18, 748.5

[56] References Cited

U.S. PATENT DOCUMENTS

| | | | |
|---|---|---|---|
| 4,079,650 | 3/1978 | Deutsch et al. | 84/1.26 |
| 4,225,933 | 9/1980 | Monden | 364/722 |
| 5,075,868 | 12/1991 | Andes et al. | 395/23 |
| 5,167,008 | 11/1992 | Engeler | 395/27 |
| 5,252,330 | 10/1993 | Ramacher et al. | 395/27 |
| 5,271,090 | 12/1993 | Boser | 395/21 |
| 5,278,945 | 1/1994 | Basehore et al. | 395/27 |
| 5,359,700 | 10/1994 | Seligson | 395/24 |
| 5,465,320 | 11/1995 | Enbutsu et al. | 395/22 |

OTHER PUBLICATIONS

D. Marino, "New Algorithms for the Approximate Evaluation in Hardware of Binary Logarithms and Elementary Functions," IEEE Transaction on Computers, Dec. 1972, pp. 1416–1421.

Shlomo Waser and Michael J. Flynn, "Introduction to Arithmetic for Digital Systems Designers," 1992, Chapter 4: Multiplication, pp. 131–137.

*Primary Examiner*—Chuong Dinh Ngo
*Attorney, Agent, or Firm*—Susan C. Hill

[57] ABSTRACT

A method and apparatus for approximating a sigmoidal response using digital circuitry for neural network computations. The digital circuitry in processing element (16) produces the neuron output signal (110) by performing a squashing operation which determines an approximation of a sigmoid function. In one form, the present invention uses digital circuitry (16) in data processor (10) to approximate a sigmoid function of a neuron (100) using a plurality of parabolas. In an alternate embodiment, the sigmoid function of neuron (100) is approximated using a quasi-$log_2$ function.

11 Claims, 5 Drawing Sheets

$f_1(x) = c_1 - (b_1 x - a_1)^2$
WHERE $a_1$, $b_1$, and $c_1$ are constants $f_2(x) = c_2 - (b_2 x - a_2)^2$
WHERE $a_2$, $b_2$, and $c_2$ are constants COMPUTATION OF A SECOND ORDER POLYNOMIAL
$f(x) = c - (bx - a)^2$ WHERE:
"s" IS A SIGN BIT
"e" IS THE NUMBER OF RIGHT SHIFTS PERFORMED PLUS BIT 3
"m" ARE THE LEAST SIGNIFICANT BITS REMAINING
    AFTER COMPLETION OF THE RIGHT SHIFTS

METHOD AND APPARATUS FOR APPROXIMATING A SIGMOIDAL RESPONSE USING DIGITAL CIRCUITRY

This application is a continuation of patent application No. 08/463,152 filed Jun. 5, 1995, now abandoned, which is a divisional of application No. 08/125,670 filed Sep. 23, 1993, now abandoned.

REFERENCE TO RELATED APPLICATIONS

The present application is related to the following U.S. patent application: Attorney Docket No. SC-01700A, titled "A Data Processing System And Method Thereof", filed Mar. 31, 1993, invented by Michael G. Gallup et al., and having Ser. No. 08/040,779.

FIELD OF THE INVENTION

The present invention relates in general to a method and apparatus for approximating a sigmoidal response, and more particularly to a method and apparatus for approximating a sigmoidal response using digital circuitry.

BACKGROUND OF THE INVENTION

The use of artificial neural networks is becoming more common today in a variety of applications. In a neural network array, each neuron receives a plurality of input signals. Typically, each neuron then performs a weighted summation of the input signals to generate an intermediate result. A "squashing" operation is then performed on the intermediate result in order to produce a digital output signal which has a value that falls within a predetermined range of values. That is, the intermediate result is "squashed" to fit within a smaller, predetermined range of digital output values. For example, if eight digital data bits are available to represent the digital output value, then the intermediate result must be "squashed" to fit within the range of decimal numbers –128 to 127, which can be represented by eight binary bits.

The "squashing" operation involves approximating a sigmoidal response using digital circuitry. One prior art approach approximates the sigmoid function using piecewise linear approximations. The sigmoid function is divided into a plurality of linear segments, where each linear segment can be described by an intercept value and a slope value. The digital circuitry selects the particular line segment which corresponds to a given intermediate value. The digital output value is then calculated using the intermediate value and using an intercept value and a slope value for the selected line segment.

Unfortunately, using the piecewise linear approximation approach, one or more upper and lower boundary checks (e.g. using a window comparator) must be performed in order to select which line segment should be used. Also, this approach requires a significant number of line segments in order to achieve the accuracy required by some applications. And if a large number of line segments are required, a large number of intercept values and slope values must be stored, for example in a table in memory. A more efficient approach was needed for approximating a sigmoidal response in a digital data processor.

SUMMARY OF THE INVENTION

The previously mentioned needs are fulfilled and other advantages achieved with the present invention. In one form, the present invention is an apparatus and a method for approximating a sigmoidal response in a digital data processor. In one embodiment, the present invention has shift circuitry for performing a shift operation and has a counter for counting a number of times the shift operation is performed. The present invention also has a logic circuit for determining if a binary input value has a logical one value above a predetermined bit position. In addition, the present invention has control circuitry for providing control signals. The control circuitry is coupled to the shift circuitry, to the counter, and to the logic circuit.

In an alternate embodiment, the present invention has a first register for storing a first polynomial coefficient, a second register for storing a second polynomial coefficient, and a third register for storing a third polynomial coefficient. In addition the present invention also has an adder circuit having a first input, a second input, and an output. The present invention also has a first bus for transferring data. The first bus is coupled to the first, second, and third registers, and to the first input of the adder circuit. The present invention also has a second bus for transferring data. The second bus is coupled to the first, second, and third registers, and to the second input of the adder circuit. The present invention also has a third bus for transferring data. The third bus is coupled to the first, second, and third registers, and to the output of the adder circuit. An output value is generated from an input value by solving one of a first second-order polynomial equation and a second second-order polynomial equation.

The present invention will be understood by one skilled in the art from the detailed description below in conjunction with the accompanying drawings.

DESCRIPTION OF THE PREFERRED EMBODIMENTS

The present invention has a plurality of processing elements 16 in a digital data processor 10. One or more of these processing elements 16 may form a neuron. One or more of these neurons may then be arranged and used as a neural network in a wide variety of applications.

In one embodiment of the present invention, each processing element 16 within a digital data processor 10 is capable of combining a plurality of digital input signals to produce a digital weighted summation as an intermediate result. This intermediate result is then "squashed" to produce a digital output signal. The "squashing" operation involves approximating a sigmoidal response using digital circuitry.

In one embodiment of the present invention, the sigmoid function is approximated using a plurality of parabolas, where each parabola is represented mathematically by a second order quadratic equation. The digital circuitry within each processing element 16 selects which quadratic equation to use, retrieves the appropriate constant values, and performs the data transfers and data computations in an efficient manner.

In an alternate embodiment, the sigmoid function is approximated using a quasi-$\log_2$ function. This single quasi-$\log_2$ function, by itself, is sufficient to approximate the entire sigmoid function. As a result, there is no need to determine which line segment or which parabola to select. Instead, the same computations are performed on any intermediate value in order to produce the corresponding output value. Mathematically and graphically, the quasi-$\log_2$ function is similar to, but not the same as, determining $f(x)=\log_2(x)$. The digital circuitry within each processing element 16 must perform the data transfers and data computations in an efficient manner.

The term "bus" will be used to refer to a plurality of signals or conductors which may be used to transfer one or more various types of information, such as data, addresses, control, or status.

The symbol "%" preceding a number indicates that the number is represented in its binary or base two form.

Figure 1:
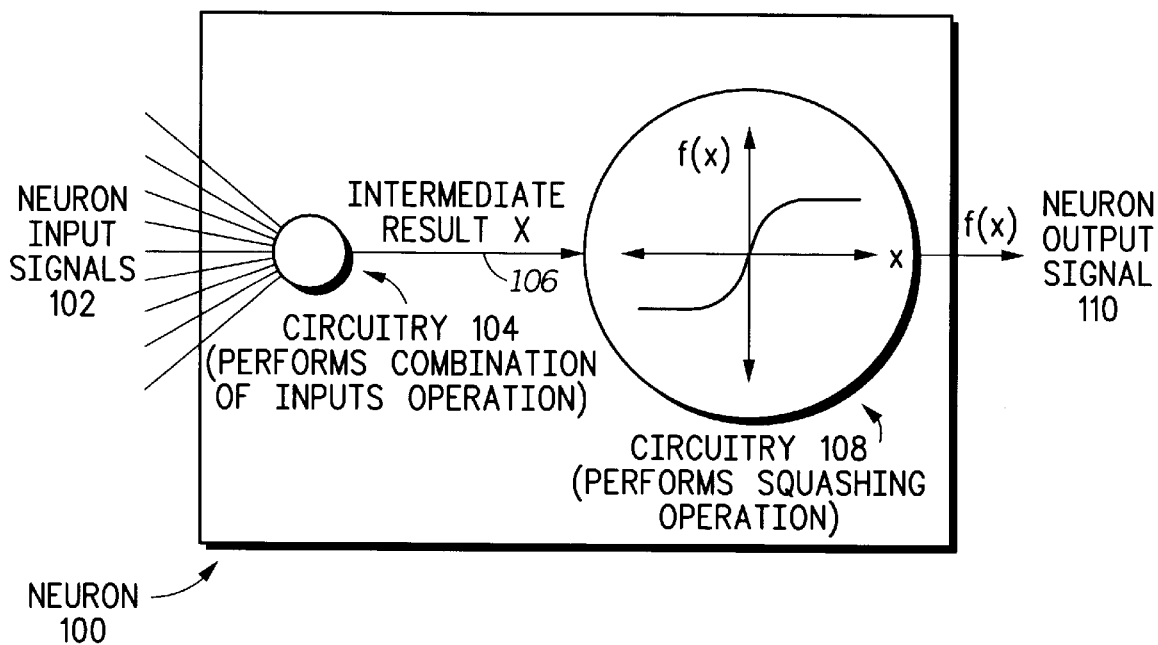
FIG. 1 illustrates, in block diagram form, a neural network neuron in accordance with one embodiment of the present invention.

FIG. 1 illustrates a neuron 100. Neuron 100 may be used alone, or may be part of a neural network (not shown) formed from a plurality of neurons 100 which are coupled in a one, two, or three dimensional array. In one embodiment of the present invention, data processor 10 (see FIG. 3) may be used to implement neuron 100.

Neuron 100 receives a plurality of neuron input signals 102. Neuron 100 has circuitry 104 which receives the plurality of neuron input signals 102 as inputs and performs an operation to combine the inputs to produce an intermediate result signal 106 having a value "x". In one embodiment of the present invention, circuitry 104 performs a weighted summation of the plurality of neuron input signals 102, and the intermediate result is thus a weighted summation result. Neuron 100 also has circuitry 108 which receives the intermediate result signal 106 as an input and performs a squashing operation to produce neuron output signal 110 having a value "f(x)", where f(x) approximates the sigmoidal waveform illustrated graphically in FIG. 1.

Figure 2:
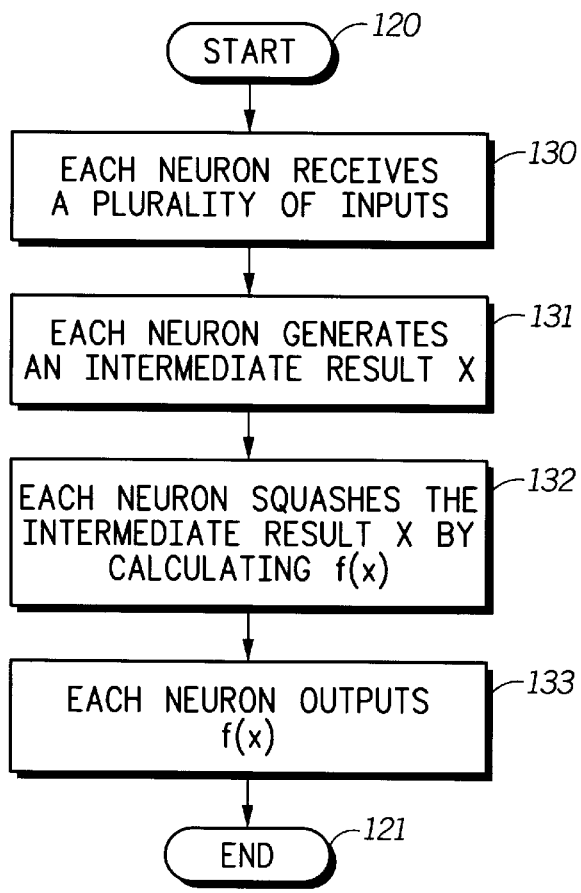
FIG. 2 illustrates, in flow diagram form, a method for transforming inputs to a neuron into a corresponding output in accordance with one embodiment of the present invention.

FIG. 2 illustrates, in flow diagram form, a method for transforming inputs to a neuron into a corresponding output in accordance with one embodiment of the present invention.

Flattened oval 120 represents a starting point in the flow diagram. Flattened oval 121 represents an ending point in the flow diagram. Rectangles 130–133 represent steps which are performed in order to transform a plurality of neuron inputs signals 102 into a corresponding neuron output signal 110.

Figure 3:
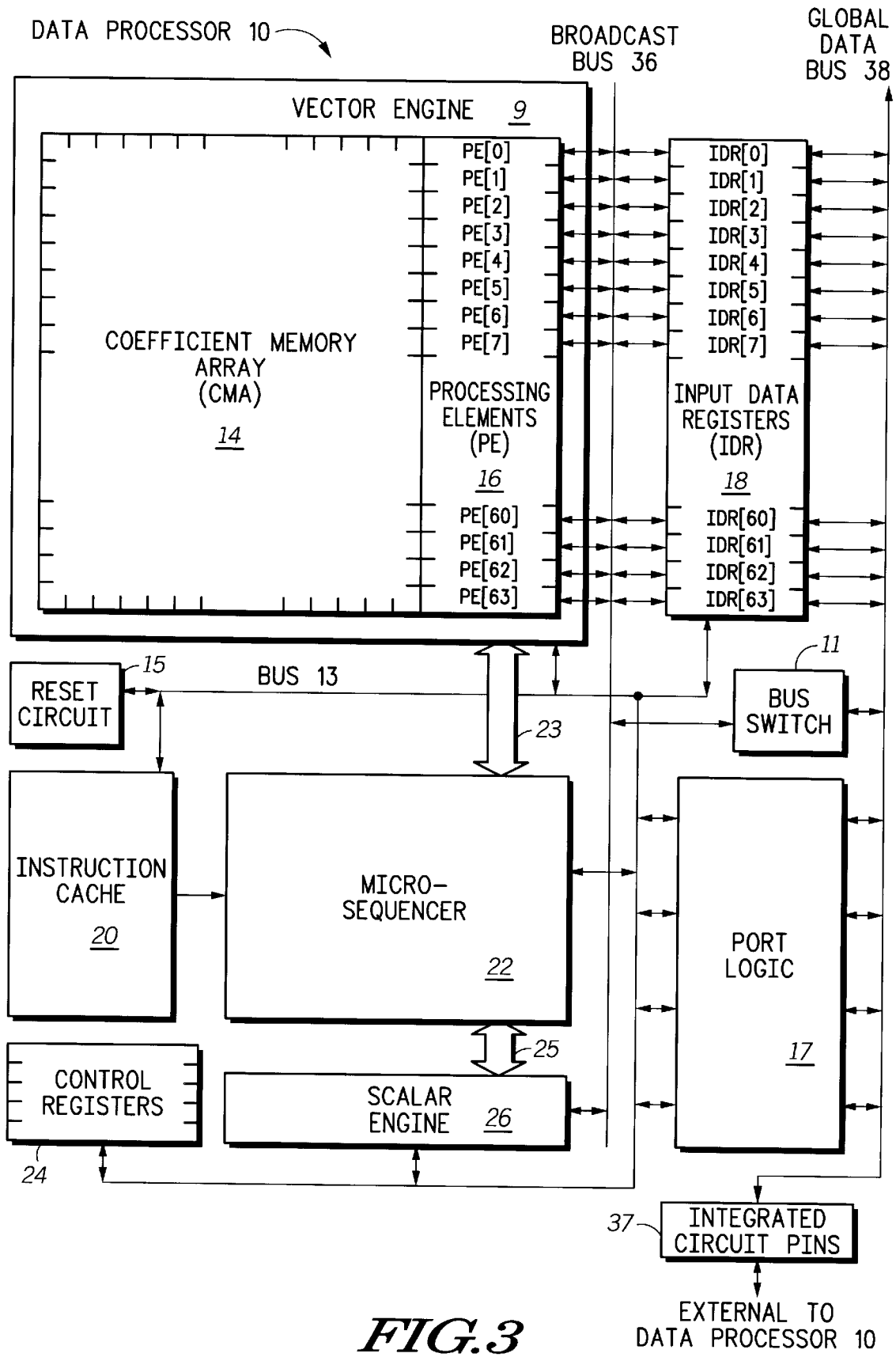
FIG. 3 illustrates, in block diagram form, a data processor in accordance with one embodiment of the present invention.

FIG. 3 illustrates one embodiment of a digital data processor 10 which can be used to implement neuron 100 (see FIG. 1). Data processor 10 may also be used to perform other operations which are unrelated to neural networks.

Vector engine 9, Input Data Registers (IDR) 18, reset circuit 15, instruction cache 20, microsequencer 22, control registers 24, scalar engine 26, and port logic 17 are all bi-directionally coupled to each other by way of the conductors labeled bus 13. In one embodiment of the present invention, port logic 17 has four separate ports (not shown). In one embodiment of the present invention, there are sixty-four Input Data Registers (IDR) 18.

Bus switch 11 is coupled between global data bus 38 and broadcast bus 36. Microsequencer 22 is bi-directionally coupled to vector engine 9 by way of bus 23 in order to transfer control and status information. Microsequencer 22 is bi-directionally coupled to scalar engine 26 by way of bus 25 in order to transfer control and status information. Vector engine 9 includes a coefficient memory array (CMA) 14 and a plurality of processing elements (PE) 16. In one embodiment of the present invention, there are sixty-four processing elements 16. The coefficient memory array 14 is coupled to the plurality of processing elements 16. Each processing element 16 is bi-directionally coupled to broadcast bus 36. Each Input Data Register 18 is bi-directionally coupled to broadcast bus 36. Scalar engine 26 is also bi-directionally coupled to broadcast bus 36.

Each Input Data Register 18 is bi-directionally coupled to global data bus 38. Port logic 17 is bi-directionally coupled to global data bus 38. Integrated circuit pins 37 are bi-directionally coupled to global data bus 38. Integrated circuit pins 37 are used to transfer data to and from external to data processor 10. In one embodiment of the present invention, data processor 10 is implemented on a single integrated circuit. Note that in FIG. 3, each conductive line represents a plurality of conductors.

Figure 4:
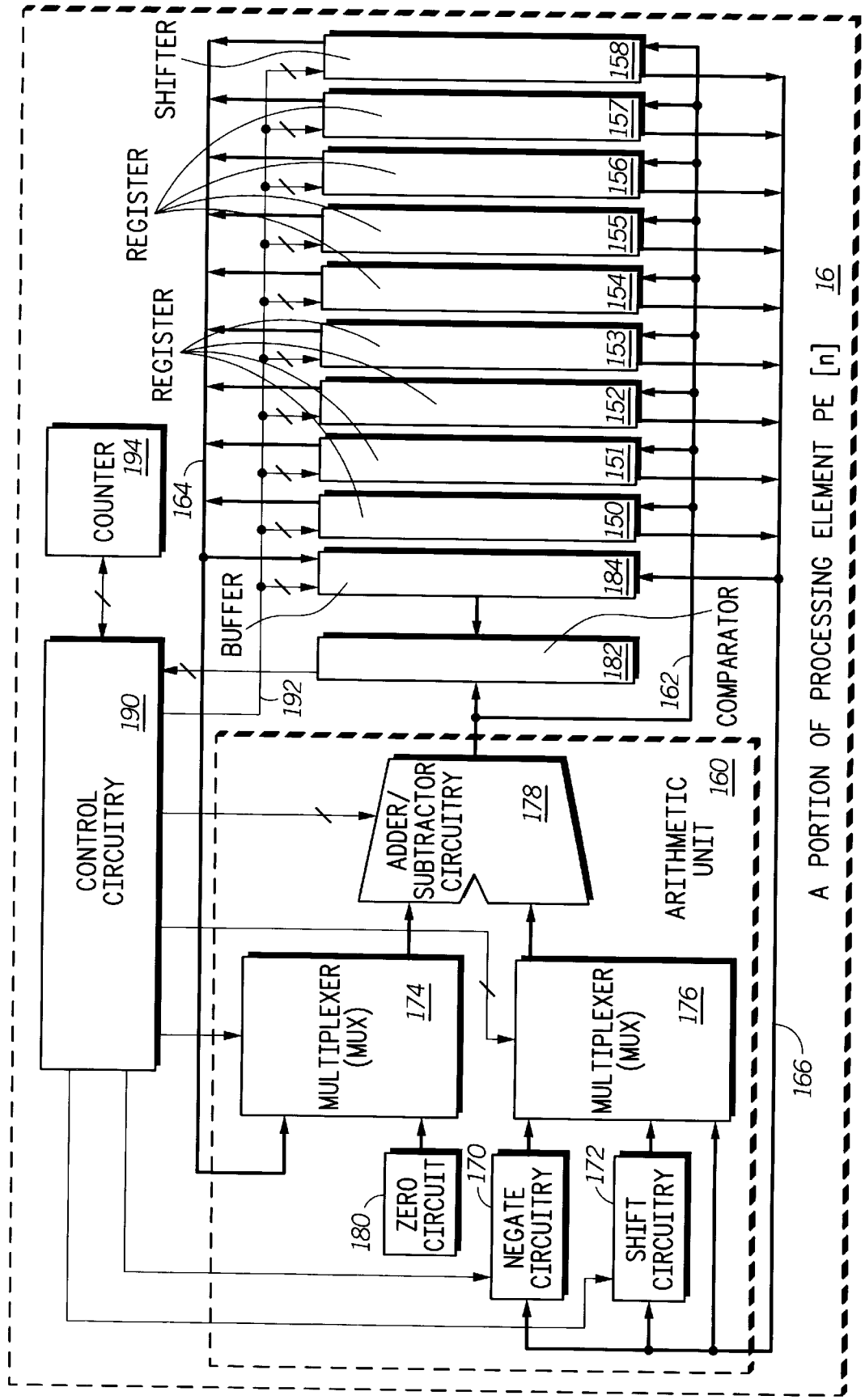
FIG. 4 illustrates, in block diagram form, a portion of a processing element of FIG. 3 in accordance with one embodiment of the present invention.

FIG. 4 illustrates a portion of a processing element 16 of FIG. 3. Each of the sixty-four processing elements 16 include the circuitry illustrated in FIG. 4. Each processing element PE[n] 16 has a plurality of register circuits 150–157 and a shifter circuit 158. Registers 150–157 and shifter 158 are coupled to an output of arithmetic unit circuitry 160 by way of bus 162 in order to receive data from arithmetic unit 160. Registers 150–157 and shifter 158 are coupled to a first input of arithmetic unit 160 by way of bus 164 in order to provide data to arithmetic unit 160. Registers 150–157 and shifter 158 are likewise coupled to a second input of arithmetic unit 160 by way of bus 166 in order to provide data to arithmetic unit 160.

Arithmetic unit 160 has negate circuitry 170, shift circuitry 172, multiplexer circuitry (MUX) 174, multiplexer circuitry (MUX) 176, an adder/subtracter circuitry 178, and a zero circuit 180. Negate circuitry 170 and shift circuitry 172 have an input coupled to bus 166. MUX 176 has a first input coupled to the output of negate circuitry 170, a second input coupled to the output of shift circuitry 172, and a third input coupled to bus 166. MUX 174 has a first input coupled to bus 164 and a second input coupled to zero circuit 180. Arithmetic unit 160 has a first input coupled to the output of MUX 174, a second input coupled to the output of MUX 176, and an output coupled to bus 162.

Control circuitry 190 is coupled to negate circuitry 170, shift circuitry 172, MUX 174, MUX 176, and adder/subtracter circuitry 178 in order to provide control signals. Control circuitry 190 is coupled to registers 150–157 and shifter 158 by way of control signals 192. Control circuitry 190 generates control signals 192 in order to control the transfer of data between registers 150–157, buffer circuitry 184, comparator circuitry 182, and arithmetic unit 160.

Control circuitry 190 is bi-directionally coupled to counter circuitry 194. Control circuitry 190 provides one or more control signals to counter 194 which causes counter 194 to count. Control circuitry 190 provides one or more control signals to counter 194 which cause counter 194 to increment by one. Control circuitry 190 also provides one or more control signals to counter 194 which cause counter 194 to be reset to an initial value. Counter 194 supplies the count value to control circuitry 190.

Comparator 182 has a first input coupled to bus 162 in order to receive data from the output of arithmetic unit 160. Comparator 182 has a second input coupled to an output of buffer 184 in order to receive data from buffer 184. Comparator 182 is bi-directionally coupled to control circuitry 190 in order to receive control signals and to provide one or more comparison result signals. Buffer 184 is coupled to bus 164 in order to receive data. Likewise, buffer 184 is coupled to bus 166 in order to receive data. Note that in FIG. 4, each thick conductive line represents a plurality of conductors which are part of the data path in processing element 16. Each thick conductive line represents one or more conductors which are used to transfer one or more control signals in processing element 16.

Figures 5, 6:
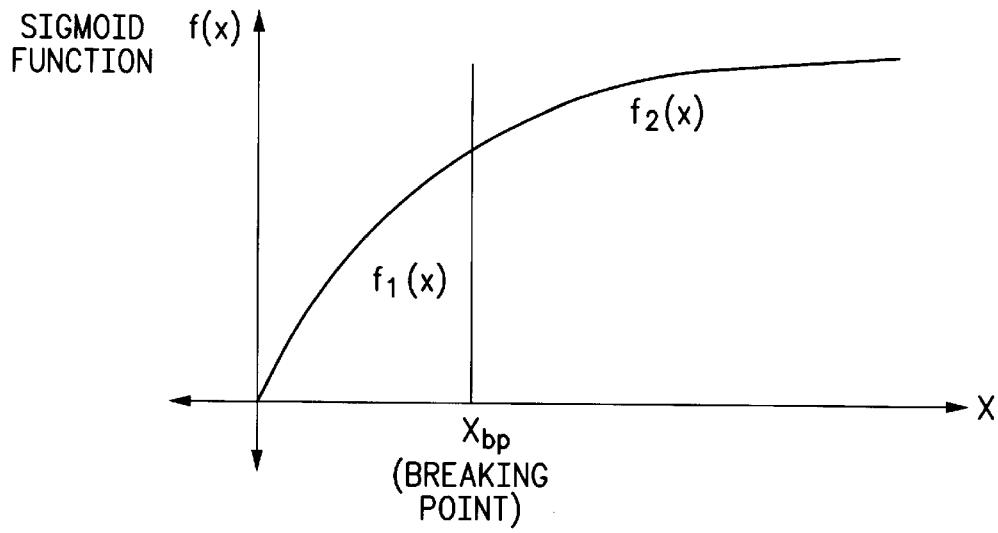
FIG. 5 illustrates, in graphical and mathematical form, an approximation of a sigmoid function in accordance with one embodiment of the present invention.
FIG. 6 illustrates, in block diagram form, an example computation for approximating a sigmoid function in accordance with one embodiment of the present invention.

The operation of the present invention will now be described. FIGS. 5 and 6 illustrate one approach for approximating a sigmoid function. For values of "x" less than a predetermined value (i.e. the breaking point value $x_{bp}$), a first parabola $f_1(x)$ is used to approximate the sigmoid function. For values of "x" greater than a predetermined value (i.e. the same breaking point value $x_{bp}$), a second parabola $f_2(x)$ is used to approximate the sigmoid function. Unlike line segments, both the graph of a parabola and the graph of a sigmoid function are curved. Thus fewer parabolas than line segments may be used to approximate a sigmoid function with similar accuracy.

Although alternate embodiments of the present invention may use any number of parabolas to approximate a sigmoid function, the particular embodiment of the present invention illustrated in FIGS. 5 and 6 uses two parabolas. Note that if "N" parabolas are used to approximate a sigmoid function, there will be "N–1" breaking points $x_{bp}$.

Different neural network applications may require different sigmoid responses. Conventional techniques known in the art may be used to determine the exact sigmoid function required for a particular application. Once the desired sigmoid function has been determined, conventional computer software tools can be used to determine a first parabola $f_1(x)$ which most closely approximates the shape of the sigmoid function below the breaking point $x_{bp}$, and a second parabola $f_2(x)$ which most closely approximates the shape of the sigmoid function above the breaking point $x_{bp}$. Each parabola can then be expressed mathematically by a second order polynomial equation in the form $f(x)=rx^2+sx+t$ where r, s, and t are constants.

However, the computational steps required to solve $f(x)=rx^2+sx+t$ may not be adequately efficient when executed by digital circuitry such as processing element 16 (see FIG. 4). Thus the second order polynomial equation can be mathematically rearranged in the form $f(x)=c-(bx-a)^2$, where a, b, and c are different constant values. Thus below the breaking point $x_{bp}$, the first parabola $f_1(x)=c_1-(b_1x-a_1)^2$ is used to approximate the sigmoid function. And above the breaking point $x_{bp}$, the second parabola $f_2(x)=c_2-(b_2x-a_2)^2$ is used to approximate the sigmoid function.

The absolute value of "x", also represented as |x|, is compared to the breaking point value $x_{bp}$. If the absolute value of "x" is less than $x_{bp}$, the first parabola $f_1(x)$ is used to approximate the sigmoid function. And if the absolute value of "x" is greater than $x_{bp}$, the second parabola $f_2(x)$ is used to approximate the sigmoid function. If the absolute value of "x" is equal to $x_{bp}$, alternate embodiments of the present invention may use either parabola $f_1(x)$ or $f_2(x)$ to approximate the sigmoid function.

Referring to FIG. 4, the compare operation is performed by comparator 182. One of the values to be compared is stored in buffer 184. The other value to be compared is received by comparator 182 from the output of arithmetic unit 160.

Note that a value can be provided from the output of arithmetic unit 160 in the following manner. A register value stored in one of registers 150–157 is transferred to the second input of adder/subtracter circuitry 178 by way of bus 166 and MUX 176. Zero circuit 180 inputs all zeros, namely an 8-bit zero value in the illustrated embodiment, to the first input of adder/subtracter circuitry 178 by way of MUX 174. Adder/subtracter circuitry 178 then adds the 8-bit zero value to the register value, or subtracts the 8-bit zero value from the register value. This addition or subtraction does not change the register value because the other operand is zero. Thus, the register value is output at the output of adder/subtracter circuitry 178, which is also the output of arithmetic unit 160.

This approach may also be used to transfer a value stored in a first one of registers 150–157 to a second one of registers 150–157. Alternate embodiments of the present invention may use an arithmetic logic unit (ALU) (not shown) instead of arithmetic unit 160. If an ALU (not shown) is used, logically ANDing an input operand value with all ones or logically ORing an input operand value with all zeroes may alternately be used to pass values through the ALU unchanged.

It is important to note that a sigmoid function is symmetrical about the origin. Thus even though the value "x" may be either a positive or a negative number, the sign of "x" does not affect the computation of $|f(x)|$. The absolute value of "x", |x|, is used to compute f(x). Then if the original sign of "x" was positive, the sign of f(x) is positive. And if the original sign of "x" was negative, the sign of f(x) is negative. For example, if "x" is represented as a signed number having a sign bit, the sign bit may be disregarded during the computation of f(x), and the resulting sign of f(x) will be the same as the original sign of "x".

FIG. 6 illustrates an example computation for computing $f(x)=c-(bx-a)^2$ using the circuitry of processing element 16 illustrated in FIG. 4. FIG. 5 illustrates the graph of the function $f_1(x)=c_1-(b_1x-a_1)^2$ for values of "x" less than $x_{bp}$, and the graph of the function $f_2(x)=c_2-(b_2x-a_2)^2$ for values of "x" greater than or equal to $x_{bp}$.

In the embodiment of the present invention illustrated in FIG. 4, registers 150–157 are identical 8-bit registers which can be used to store 8-bit values, busses 162, 164, and 166 are 8-bit busses, shifter 158 is a 16-bit shift register, and arithmetic unit 160 can process 8-bits in parallel. Each small box in FIG. 6 represents one bit of data. Note that this example uses data sizes which are multiples of eight, namely 8-bits, 16-bits, 24-bits, and 32-bits. The reason for using these data sizes is for the convenience of data storage and movement. Alternate embodiment of the present invention may use any convenient data size. As an example, the number of bits used for each value illustrated in FIG. 6 may be doubled.

FIG. 6 will now be discussed in detail. The 16-bit absolute value of "x" is stored in any two of the registers 150–157.

Each of the 8-bit constants "b" and "c" are stored in one of the registers 150–157. The 16-bit constant "a" is stored in two of the registers 150–157. The sign of "x" can be stored in one of the registers 150–157. Alternately, since the sign of "x" can be represented by one bit, the sign of "x" can be stored in a storage circuit, such as a flip-flop (not shown) within control circuitry 190. Thus before computations begin, at least five registers 150–157 are being used to store data values.

In one embodiment of the present invention, constants "a", "b", and "c" may be loaded and stored in scalar registers (not shown) in scalar engine 26 until they are needed by processing elements 16. The constants "a", "b", and "c" can then be transferred to processing elements 16 across broadcast bus 36. In an alternate embodiment of the present invention, constants "a", "b", and "c" may be provided to data processor 10 as bit fields within an instruction which is received by and stored in instruction cache 20. The execution of the instruction would perform the steps illustrated in FIG. 6. In yet another embodiment of the present invention, constants "a", "b", and "c" may be loaded and stored in coefficient memory array (CMA) 14 until they are needed by processing elements 16. The constants "a", "b", and "c" can then be transferred to processing elements 16 across broadcast bus 36. Using this approach, each processing element 16 may use a different set of constants "a", "b", and "c".

Referring to FIG. 6, step #1 requires the multiplication of the 16-bit value |x| by the 8-bit constant value "b". In one embodiment of the present invention, the multiplication is performed by using arithmetic unit 160 to perform two 8-bit by 8-bit multiplies using a version of a multiplication algorithm called the Booth algorithm. In one embodiment, the Booth algorithm uses two registers 150–157 to sequentially store the two 8-bit operands, intermediate values, and the 16-bit result. In addition, the Booth algorithm uses the 16-bit shifter 158 to perform 2-bit down shifts, and uses the arithmetic unit 160 to perform addition operations. The use of the Booth multiplication algorithm is well known to one of average skill in the art. In an alternate embodiment, the 8-bit by 8-bit multiplies could be performed merely by repeated shift and add operations. In yet another embodiment, a hardware multiplier circuit (not shown) could be added to processing element 16 in FIG. 4 in order to implement the required multiply operations.

Buffer 184 and the three empty registers 150–157 may be used as temporary storage. First, the lower 8-bits of |x| are multiplied by "b" to produce a 16-bit lower multiply result. The 16-bit lower multiply result is stored in two registers 150–157. Second, the upper 8-bits of |x| are multiplied by "b" to produce a 16-bit upper multiply result. The 16-bit upper multiply result is stored in two of the registers 150–157. Note that the |x| is no longer needed; so the two registers 150–157 storing |x| may be used to store other values.

The lower byte of the 16-bit lower multiply result is the lower byte of result "R1". The middle byte of result "R1" is produced by using arithmetic unit 160 to add the upper byte of the 16-bit lower multiply result and the lower byte of the 16-bit upper multiply result. This addition produces a carry out bit having a logical zero or a logical one value. The carry bit may be stored in arithmetic unit 160 or in control circuitry 190.

The upper byte of result "R1" is produced by using arithmetic unit 160 to add the carry out bit and the upper byte of the 16-bit upper multiply result. The 24-bit result value "R1" is then stored in three of the registers 150–157. In an alternate embodiment of the present invention, the lower byte of result "R1" is not stored in a register 150–157 because it will not be needed for further computations. Note that the 16-bit lower multiply result value and the 16-bit upper multiply result value are no longer needed; and thus the registers 150–157 storing those values may be overwritten.

Step #2 requires that the 16-bit constant value "a" be subtracted from the 24-bit result "R1". In alternate embodiment of the present invention, mathematically equivalent operations could be performed. For example, the negative of "a" could be added to the result "R1".

The subtraction is performed by using arithmetic unit 160 to perform two 8-bit by 8-bit subtractions. First, the lower byte of "a" is subtracted from the middle byte of the result value "R1" to produce the lower byte of the 16-bit result value "R2". This subtraction also produces a borrow bit having a logical zero or a logical one value. The borrow bit may be stored in arithmetic unit 160 or in control circuitry 190. Second, the upper byte of "a" and the borrow bit are subtracted from the upper byte of the result value "R1" to produce the upper byte of the 16-bit result value "R2". The 16-bit result value "R2" is stored in two of the registers 150–157. Note that as the bytes of the result value "R1" are no longer needed, the registers 150–157 storing those bytes may be overwritten and used to store other values.

Step #3 requires the multiplication of the 16-bit result value "R2" by the 16-bit result value "R2". The multiplication is performed by using arithmetic unit 160 to perform four 8-bit by 8-bit multiplies. Buffer 184 and the empty registers 150–157 may be used as temporary storage. First, the lower byte of the result value "R2" is multiplied by the lower byte of the result value "R2" to produce a 16-bit lower multiply result. The 16-bit lower multiply result is stored in two of the registers 150–157. Second, the lower byte of the result value "R2" is multiplied by the upper byte of the result value "R2" to produce a 16-bit middle multiply result. The 16-bit middle multiply result is stored in two of the registers 150–157. To produce a 16-bit upper multiply result. Third, the upper byte of the result value "R2" is multiplied by the upper byte of the result value "R2" to produce a 16-bit upper multiply result. The 16-bit upper multiply result is stored in two of the registers 150–157.

The three 16-bit lower, middle, and upper multiply result values must now be added, including a carry bit to store carry-in and carry-out information. The lower byte of the 16-bit lower multiply result is the lowest byte (byte 0) of result value "R3". The lower byte of the middle multiply result is added to the lower byte of the middle multiply result and to the upper byte of the lower multiply result to produce a first carry bit and the next byte (byte 1) of result value "R3". The upper byte of the middle multiply result is added to the upper byte of the middle multiply result, to the lower byte of the upper multiply result, and to the first carry bit to produce a second carry bit and the next byte (byte 2) of result value "R3". The upper byte of the upper multiply result is added to the second carry bit to produce the next byte (byte 3) of result value "R3".

The 32-bit result value "R3" is stored in four of the registers 150–157. In an alternate embodiment of the present invention, only the uppermost byte (byte 3) of result value "R3" is stored in a register 150–157 because it is the only byte of result "R3" which is needed for further computations. Note that as the bytes of the result value "R2" are no longer needed, the registers 150–157 storing those bytes may be overwritten and used to store other values.

Step #4 requires that the uppermost byte (byte 3) of result value "R3" be subtracted from the 8-bit constant value "c". In an alternate embodiment of the present invention, mathematically equivalent operations could be performed. For example, the negative of the uppermost byte (byte 3) of result value "R3" could be added to the constant "c".

The subtraction is performed by using arithmetic unit 160 to perform one 8-bit by 8-bit subtraction. The uppermost byte (byte 3) of result value "R3" is subtracted from the constant value "c" to produce 8-bit result value "R4". This subtraction will never require a borrow and the result value "R4" will never be a negative number. The 8-bit result value "R4" is stored in one of the registers 150–157. Note that when the uppermost byte (byte 3) of result value "R3" is no longer needed, the register 150–157 storing that byte may be overwritten and used to store another value.

Note that the registers 150–157 storing constant values a, b, and c may or may not be overwritten. If the registers 150–157 storing constant values a, b, and c are not overwritten, then these register do not have to be reloaded if another computation of f(x) is to be performed by processing unit 16.

The result value "R4" is the absolute value of f(x), namely |f(x)|. The sign of f(x) is the same as the sign of "x". So the one bit representing the sign of "x" is retrieved and used as the sign of f(x). The sign bit may be included as part of f(x). Alternately, |f(x)| may be converted to another form, such as 2's complement form, if the sign bit indicates that f(x) is negative. Negate circuitry 170 and adder/subtracter circuitry 178 may be used to generate the 2's complement form of f(x). Negate circuitry 170 negates an input value by negating each bit of the binary value it receives. In the embodiment of the invention illustrated in FIG. 4, f(x) is an 8-bit value which is stored in one of the registers 150–157.

The value representing f(x) may then be output from the neuron as the neuron output signal 110 (see FIG. 1). If the neuron 100 illustrated in FIG. 1 is implemented by the data processor 10 illustrated in FIGS. 3 and 4, then the 8-bit f(x) value stored in one of the registers 150–157 is transferred to the input data registers 18. The value f(x) is then transferred external to data processor 10 by way of global data bus 38 and integrated circuit pins 37. Note that the neuron input signals 102 were received from external to data processor 10. The neuron input signals 102 were transferred from the integrated circuit pins 37 to registers 150–157 by way of global data bus 38 and input data registers 18.

Figure 7:
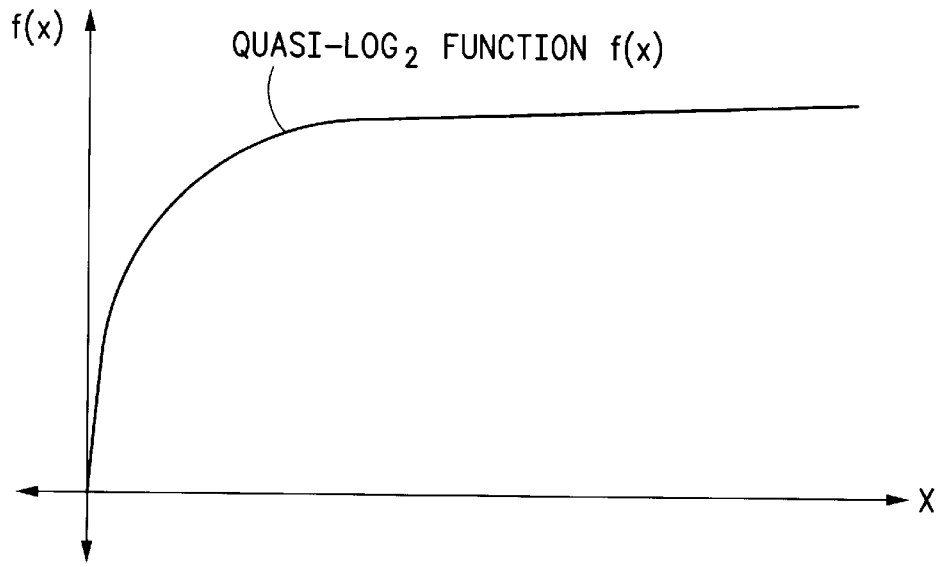
FIG. 7 illustrates, in graphical and mathematical form, an approximation of a sigmoid function in accordance with an alternate embodiment of the present invention.
Figure 8:
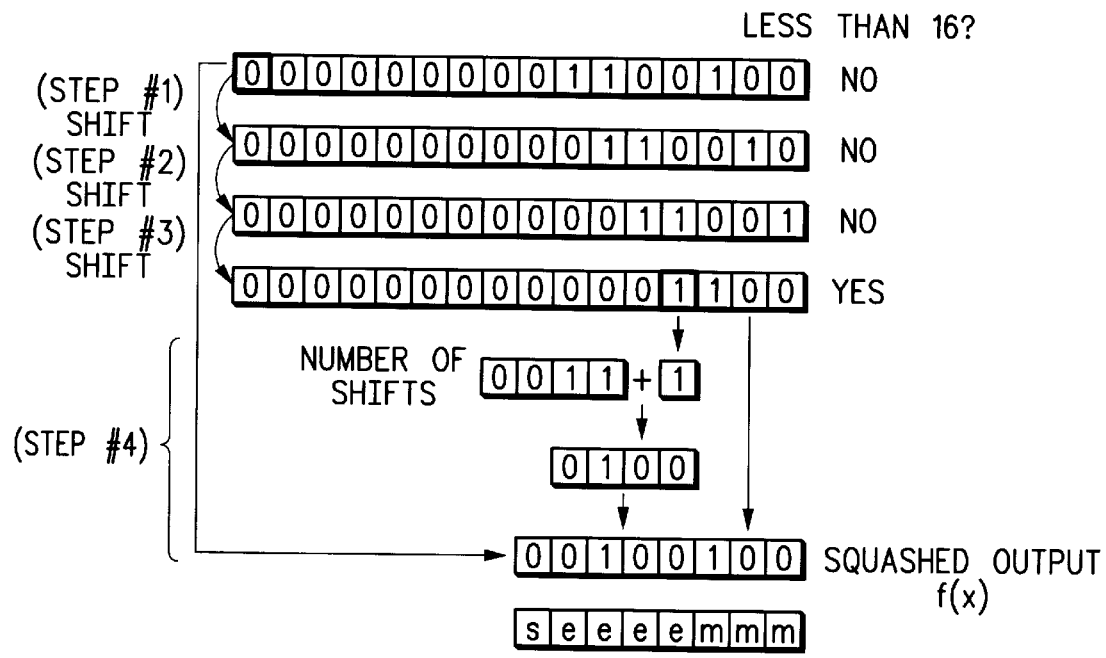
FIG. 8 illustrates, in block diagram form, an example computation for approximating a sigmoid function in accordance with an alternate embodiment of the present invention.

An alternate embodiment of the present invention will now be described. FIGS. 7 and 8 illustrate an alternate approach for approximating a sigmoid function. A quasi-$\log_2$ function f(x) is used to approximate the sigmoid function. This single quasi-$\log_2$ function, by itself, is sufficient to approximate the entire sigmoid function. As a result, there is no need for one or more breaking points and no need to determine which line segment or which parabola to select. Instead, the same computations are performed on any value "x" in order to produce the corresponding output value f(x). Mathematically and graphically, the quasi-$\log_2$ function is similar to, but not the same as, determining f(x)=$\log_2$ (x). The quasi-$\log_2$ function is used instead of the $\log_2$ (x) function because the quasi-$\log_2$ function is more easily computed using a digital data processor.

Different neural network applications may require different sigmoid responses. Conventional techniques known in the art may be used to determine the exact sigmoid function required for a particular application. Unlike the approach described above where the user must select which parabolas best approximate the sigmoid function, the quasi-$\log_2$ function is fixed. However, the user can adjust the quasi-$\log_2$ function to a specific sigmoid function by pre-scaling and/or pre-translating the value "x", or by post-scaling and/or post-translating the result f(x). The quasi-$\log_2$ function calculates a function f(x) which is mathematically similar to, but not the same as f(x)=$\log_2$(x).

The quasi-$\log_2$ function has the following advantageous characteristics in common with the typically used sigmoid functions. First, the graph of the quasi-$\log_2$ function has an S-shape which is symmetrical about the origin. Second, the quasi-$\log_2$ function is a continuous monotonic function for which the slope (i.e. the derivative) is always greater than zero. Third, the slope (i.e. the derivative) decreases as |x| increases. And fourth, the slope (i.e. the derivative) of the quasi-$\log_2$ function is relatively easy to compute. Note that computing the slope (i.e. the derivative) of the quasi-$\log_2$ function may be required by some training techniques which are used to train a neural network.

It is important to note that a sigmoid function is symmetrical about the origin. Thus even though the value "x" may be either a positive or a negative number, the sign of "x" does not affect the computation of |f(x)|. The absolute value of "x", |x|, is used to compute |f(x)|. Then if the original sign of "x" was positive, the sign of f(x) is positive. And if the original sign of "x" was negative, the sign of f(x) is negative. For example, if "x" is represented as a signed number having a sign bit, the sign bit may be disregarded during the computation of |f(x)|, and the resulting sign of f(x) will be the same as the original sign of "x".

FIG. 8 illustrates an example computation for computing f(x)=quasi-$\log_2$(x) using the circuitry of processing element 16 illustrated in FIG. 4. Although the value of "x" can be any 16-bit number, for purposes of this example "x" is assumed to be %0000000011000100 binary. FIG. 7 illustrates the graph of the function f(x)=quasi-$\log_2$(x).

In the embodiment of the present invention illustrated in FIG. 4, registers 150–157 are identical 8-bit registers which can be used to store an 8-bit value, busses 162, 164, and 166 are 8-bit busses, and arithmetic unit 160 can process 8-bits in parallel. Each small box in FIG. 6 represents one bit of data. Alternate embodiment of the present invention may use any convenient data size. For example, the number of bits used for each value illustrated in FIG. 6 may be doubled.

FIG. 8 will now be discussed in detail. The 16-bit absolute value of "x" is stored in any two of the registers 150–157. The sign of "x" can be stored in one of the registers 150–157. Alternately, since the sign of "x" can be represented by one bit, the sign of "x" can be stored in a storage circuit, such as a flip-flop (not shown) within control circuitry 190. Thus before computations begin, at least two registers 150–157 are being used to store data values.

Referring to FIG. 8, step #1 requires a compare operation to determine if |x| is less than %10000 binary (i.e. decimal 16). Referring to FIG. 4, buffer 184 is loaded with the value %00000000 binary by control circuitry 190. The upper byte of the value |x| is transferred from one of the registers 150–157. If the upper byte of |x| is greater than zero, then the value |x| is greater than 16 and the lower byte of |x| does not need to be compared. However, if the upper byte of |x| is equal to zero, then a comparison must be done on the lower byte of |x|. If a comparison must be done on the lower byte of |x|, the lower byte of the value |x| is transferred from one of the registers 150–157 and buffer 184 is loaded with the value %00010000 binary by control circuitry 190. If the lower byte of |x| is greater than or equal to %00010000 binary, then the value |x| is greater than or equal to decimal 16. If the lower byte of |x| is less than %00010000 binary, then the value |x| is less than decimal 16.

If the value |x| is greater than or equal to decimal 16, the value |x| is right-shifted one bit place by shift circuitry 172 and stored back in the same one of the registers 150–157 as the shifted value of |x|. However, if the lower byte of |x| is less than decimal 16, then no right-shifts are performed, and the operation flow jumps to the end of step #3. Step #2 is the same as step #1, only the shifted value of |x| rather than |x| is compared and shifted. Step #3 is the same as step #2.

The total number of right-shift operations which are performed are counted by counter 194. In one embodiment of the present invention, counter 194 is incremented by control circuitry 190 each time that a right-shift operation is performed. In an alternate embodiment of the present invention, counter 194 is implemented using one of registers 150–157 to store a count value. Arithmetic unit 160 is then used to add the appropriate number to the count value each time that a shift is performed.

The compare and shift operations of steps #1 through #3 are repeated until the final shifted value is less than 16. Once the final shifted value is less than 16, step #4 is performed. In one embodiment of the present invention the result value, namely the squashed output f(x), is 8-bits where the most significant bit "s" is a sign bit, the next four most significant bits "e" are somewhat analogous to exponent bits, and the three least significant bits "m" are the least significant bits of the final shifted value. Note that the function f(x)=quasi-$\log_2(x)$ is defined as zero for x=0, whereas the function f(x)=$\log_2(x)$ is undefined for x=0.

Although the bits "s", "e", and "m" are somewhat analogous to the sign, exponent, and mantissa portions of a floating point number, the squashed output f(x)=quasi-$\log_2$(x) is an integer. The letters "s", "e", and "m" are merely used to designate bit fields within the squashed output f(x). In an alternate embodiment, the squashed output f(x)=quasi-$\log_2(x)$ may be an integer having more or fewer than 8-bits.

The most significant bit "s" of the result f(x) is the sign bit from the original value "x". This sign bit may be stored in control circuitry 190 until step #4. The next four most significant bits "e" are equal to the value stored in counter 194 (i.e. the number of right-shifts) added to the value stored in the fourth least significant bit position of the shifted value |x|. Arithmetic unit 160 may be used to perform this addition. The three least significant bits "m" of the squashed output f(x) are the three least significant bits of the final shifted value of |x|. In one embodiment of the present invention, f(x)=quasi-$\log_2(x)$ is an 8-bit value which is transferred from the output of arithmetic unit 160 to one of registers 150–157 across bus 162. The squashed output f(x)=quasi-$\log_2(x)$ is thus stored in one of the registers 150–157.

In one embodiment of the present invention, arithmetic unit 160 adds 8 decimal to a count value stored in a register 150–157 each time that a shift is performed. Note that adding 8 decimal is equivalent to incrementing by one the fourth least significant bit of a binary number. The count value, since it started with an initial value of zero and is incremented by eights, has all zeros in bit location seven and above, and has all zeros in bit location two and below. Note that all bit locations start with bit location zero as the least significant bit.

Still referring to this same embodiment, the "e" and "m" portions of the squashed output f(x) are produced by adding the count value to the four least significant bits of the final shifted value. Note that in this embodiment, the count value is equal to eight times the number of shifts which have been performed. Referring to the example illustrated in FIG. 8, for this embodiment of the present invention, step # 4 includes the step of adding %00011000 (related to the number of shifts) to %00001100 (the four least significant bits of the final shifted value) in order to produce the result %00100100.

In an alternate embodiment of the present invention, counter 194 is incremented by one each time that a shift is performed. The count value, since it started with an initial value of zero and is incremented by ones, is an exact count of the number of shifts which have been performed. However, to produce the "e" bits, a modified or final count value is generated which equals the count value added to either a binary zero or a binary one, depending upon the logic state of the fourth least significant bit of the final shifted value. In this embodiment, the "e" and "m" portions of the squashed output f(x) are produced by concatenating the modified or final count value and the three least significant bits of the final shifted value.

In alternate embodiments of the present invention, the number of bits allocated to "e" and "m" may be different. For example, in an alternate embodiment of the present invention, "e" may be allocated three bits of the result and "m" may be allocated four bits of the result. In this case then, the lower byte of the value |x| is compared to the binary value %00100000 (decimal 32), rather than to binary %00010000 (decimal 16) by comparator 162. And the bit location which is added to the count value stored in counter 194 is the value stored in the fifth least significant bit position of the final shifted value of |x|, rather than the fourth least significant bit position of the final shifted value of |x|. Also, in some embodiments of the present invention, the count value is incremented by sixteen, rather than eight.

Changing the number of bits allocated to "e" and "m" can be used to modify the shape of the graph of f(x)=quasi-$\log_2$(x). In addition, changing the number of bits allocated to "e" and "m" can be used to allow for varying bit lengths of "x" and f(x).

In an alternate embodiment of the present invention, f(x) may be converted to another form, such as 2's complement form, if the sign bit indicates that f(x) is negative. Negate circuitry 170 and adder/subtracter circuitry 178 may be used to generate the 2's complement form of f(x). In the embodiment of the invention illustrated in FIG. 4, f(x) is an 8-bit value which is stored in one of the registers 150–157.

The value representing f(x) may then be output from the neuron as the neuron output signal 110 (see FIG. 1). If the neuron 100 illustrated in FIG. 1 is implemented by the data processor 10 illustrated in FIGS. 3 and 4, then the 8-bit f(x) value stored in one of the registers 150–157 is transferred to the input data registers 18. The value f(x) is then transferred external to data processor 10 by way of global data bus 38 and integrated circuit pins 37. Note that the neuron input signals 102 were received from external to data processor 10. The neuron input signals 102 were transferred from the integrated circuit pins 37 to registers 150–157 by way of global data bus 38 and input data registers 18.

In summation, the above specification describes a method and apparatus for approximating a sigmoidal response using digital circuitry. In one embodiment of the present invention, each processing element 16 within a digital data processor 10 is capable of combining a plurality of digital input signals to produce a digital weighted summation as an intermediate result. This intermediate result is then "squashed" to produce a digital output signal. The "squashing" operation involves approximating a sigmoidal response using digital circuitry.

In one embodiment of the present invention, the sigmoid function is approximated using a plurality of parabolas, where each parabola is represented mathematically by a second order quadratic equation. The digital circuitry within each processing element 16 selects which quadratic equation to use, retrieves the appropriate constant values, and performs the data transfers and data computations in an efficient manner.

In an alternate embodiment, the sigmoid function is approximated using a quasi-$\log_2$ function. This single quasi-$\log_2$ function, by itself, is sufficient to approximate the entire sigmoid function. As a result, there is no need to determine which line segment or which parabola to select. Instead, the same computations are performed on any intermediate value in order to produce the corresponding output value. Mathematically and graphically, the quasi-$\log_2$ function is similar to, but not the same as, determining $f(x)=\log_2(x)$. The digital circuitry within each processing element 16 must perform the data transfers and data computations in an efficient manner.

While the present invention has been illustrated and described with reference to specific embodiments, further modifications and improvements will occur to those skilled in the art. For example, various circuits could be used to implement any of the blocks illustrated in FIGS. 3 and 4. A different bus structure may be used in processing element 16 (see FIG. 4). Other circuitry and logic (not shown) may be included in data processing system 10 and may be coupled to various busses.

The steps illustrated in FIG. 6 may be performed by data processor 10 during execution of a single instruction. Alternately, a plurality of instructions may be used to implements the steps illustrated in FIG. 6. Likewise, the steps illustrated in FIG. 8 may be performed by data processor 10 during execution of a single instruction. Alternately, a plurality of instructions may be used to implements the steps illustrated in FIG. 8.

Although the illustrated embodiment uses all digital circuitry and all digital signals, alternate embodiments of the present invention may use some digital circuitry and some analog circuitry. Thus some of the signals used may be digital and some may be analog.

It is to be understood, therefore, that this invention is not limited to the particular forms illustrated and that it is intended in the appended claims to cover all modifications that do not depart from the spirit and scope of this invention.

I claim:

1. A method for approximating a sigmoidal response in a digital data processor, the method comprising the steps of:
   storing an input value;
   determining if the input value is greater than a predetermined breakpoint value;
   if the input value is greater than the predetermined breakpoint value, performing steps (a), (b), and (c);
   (a) transferring a first value to a first register, the first register now storing a first constant value;
   (b) transferring a second value to a second register, the second register now storing a second constant value;
   (c) transferring a third value to a third register, the third register now storing a third constant value;
   if the input value is less than the predetermined breakpoint value, performing steps (d), (e), and (f);
   (d) transferring a fourth value to the first register, the first register now storing the first constant value;
   (e) transferring a fifth value to the second register, the second register now storing the second constant value;
   (f) transferring a sixth value to the third register, the third register now storing the third constant value;
   transferring the input value and the first constant value to an adder circuit;
   using the adder circuit to perform a first plurality of addition operations in order to multiply the input value by the first constant value to produce a first result value;
   transferring the second constant value to the adder circuit;
   using the adder circuit to subtract the second constant value from the first result value to produce a second result value;
   using the adder circuit to perform a second plurality of addition operations in order to multiply the second result value by the second result value to produce a third result value;
   transferring the third constant value to the adder circuit; and
   using the adder circuit to subtract the third result value from the third constant value to produce an output value;
   wherein the first, second, and third values are constants in a first function used to approximate the sigmoidal response, and the fourth, fifth, and sixth values are constants in a second function used to approximate the sigmoidal response.

2. A method as in claim 1, further comprising the steps of:
   converting the output value to 2's complement form.

3. An apparatus for approximating a sigmoidal response in a digital data processor, the apparatus comprising:
   a first register for storing a first polynomial coefficient;
   a second register for storing a second polynomial coefficient;
   a third register for storing a third polynomial coefficient;
   an adder circuit having a first input, a second input, and an output;
   a first bus for transferring data, said first bus being coupled to said first, second, and third registers, and said first bus being coupled to the first input of said adder circuit;
   a second bus for transferring data, said second bus being coupled to said first, second, and third registers, and said second bus also being coupled to the second input of said adder circuit; and
   a third bus for transferring data, said third bus being coupled to said first, second, and third registers, said third bus being coupled to the output of said adder circuit;
   wherein an output value is generated from an input value by solving one of a first second-order polynomial equation and a second second-order polynomial equation wherein the first, second, and third polynomial coefficients have a first set of values for the first second-order polynomial equation and have a second set of values for the second second-order polynomial equation.

4. An apparatus as in claim 3, further comprising:
   negate circuitry coupled to the second input of the adder circuit.

5. An apparatus as in claim 3, further comprising:
   circuit means for inputting a plurality of logical zeros to the first input of the adder circuit.

6. An apparatus for computing an approximate sigmoidal response in a digital data processor, the apparatus comprising:
   means for determining if a magnitude of an input value is greater than a predetermined breakpoint value;

means for selecting a first 2nd-order polynomial to directly approximate a magnitude of the approximate sigmoidal response when the magnitude of the input value is less than then predetermined breakpoint value, and for selecting a second 2nd-order polynomial to directly approximate the magnitude of the approximate sigmoidal response when the magnitude of the input value is greater than the predetermined breakpoint value; and means for computing the first 2nd-order polynomial when the magnitude of the input value is less than the predetermined breakpoint value, and for computing the second 2nd-order polynomial when the magnitude of the input value is greater than the predetermined breakpoint value, said means for computing comprising:

means for computing a first result, wherein the first result equals the magnitude of the input value multiplied by a first predetermined constant;

means for computing a second result, wherein the second result equals the first result minus a second predetermined constant;

means for computing a third result, wherein the third result equals the second result multiplied by the second result; and means for computing the magnitude of the approximate sigmoidal response, wherein the magnitude of the approximate sigmoidal response equals a third predetermined constant minus the third result;

wherein the first, second, and third predetermined constants are 2nd-order polynomial constants.

7. An apparatus as in claim 6, wherein the first, second, and third predetermined constants have a first set of values for the first 2nd-order polynomial, and have a second set of values for the second 2nd-order polynomial.

8. An apparatus as in claim 7, wherein the first set of values is not identical to the second set of values.

9. An apparatus as in claim 6, further comprising:

means for determining a sign of the approximate sigmoidal response.

10. An apparatus as in claim 9, wherein the sign of the approximate sigmoidal response is identical to a sign of the input value.

11. An apparatus as in claim 6, further comprising:

means for computing a 2's complement form of the approximate sigmoidal response.

* * * * *